United States Patent [19]

Palmer et al.

[11] Patent Number: 4,808,494
[45] Date of Patent: Feb. 28, 1989

[54] THERMALLY ACTUATED HYDROGEN SECONDARY BATTERY

[75] Inventors: David N. Palmer, Tolland; John S. Cartwright, Enfield; James K. O'Neill, Tolland, all of Conn.

[73] Assignee: Combustion Engineering, Inc., Windsor, Conn.

[21] Appl. No.: 62,478

[22] Filed: Jun. 15, 1987

Related U.S. Application Data

[63] Continuation-in-part of Ser. No. 838,676, Mar. 12, 1986, abandoned, which is a continuation-in-part of Ser. No. 790,463, Oct. 23, 1985, abandoned, which is a continuation-in-part of Ser. No. 681,859, Dec. 14, 1984, abandoned.

[51] Int. Cl.$^4$ ............................................. H01M 10/39
[52] U.S. Cl. ...................................... 429/101; 429/112
[58] Field of Search ............... 429/112, 111, 110, 192, 429/59, 27, 33, 101; 204/209 R

[56] References Cited

U.S. PATENT DOCUMENTS

| | | | |
|---|---|---|---|
| 3,711,385 | 1/1973 | Beer | 204/290 F |
| 3,948,681 | 4/1976 | Barger et al. | 429/46 |
| 4,157,943 | 6/1979 | Scarpellino et al. | 204/290 F |
| 4,411,746 | 10/1983 | Degner et al. | 204/290 R |
| 4,556,614 | 12/1985 | LeMehaute et al. | 429/191 |

FOREIGN PATENT DOCUMENTS 2119561 3/1986 United Kingdom .

OTHER PUBLICATIONS

Whittingham, M. S., Jacobson, A. J., "Intercalation Chemistry", Chapter 13, pp. 405–443, Academic Press, N.Y., (1982).
O'M. Bockris, J. "Energy: The Solar-Hydrogen Alternative", Chapter 10, pp. 207–223, John Wiley & Sons Inc. N.Y. (1975).
Ohta, T., "Solar Hydrogen Energy Systems", Chapter 9 pp. 193–219, Pergamon Press, Oxford (1979).

Primary Examiner—Donald L. Walton
Attorney, Agent, or Firm—Braumbaugh, Graves, Donohue & Raymond

[57] ABSTRACT

A thermally actuated hydrogen secondary battery which comprises a porous anode having a thermally actuated anode-active solid reversible hydrogen-containing inorganic compound which deintercalates hydrogen ions ($H^+$) in a discharge cycle when exposed to thermal energy and having a first porous catalytic oxide film on a side thereof capable of converting hydrogen ions into hydrogen molecules in a discharge cycle and having a second porous catalytic metal film on another side thereof capable of converting hydrogen molecules into hydrogen ions in a charge cycle; a porous cathode having a hydrogen ion-intercalatable cathode-active material which intercalates hydrogen ions ($H^+$) in a discharge cycle when the anode is exposed to thermal energy and having a first porous catalytic metal film on a side thereof capable of converting hydrogen molecules into hydrogen ions in a discharge cycle and having a second porous catalytic oxide film selected from the group consisting of ruthenium dioxide, rhenium dioxide and iridium dioxide on another side thereof capable of converting hydrogen ions into hydrogen molecules in a charge cycle, said first porous catalytic metal film on said porous cathode facing said first porous catalytic oxide film on said porous anode; and a porous solid electrolyte between and within the porous anode and the porous cathode, said porous solid electrolyte containing at least one gas selected from the group consisting of hydrogen and helium for the diffusion of hydrogen molecules between the anode and the cathode, said porous solid electrolyte being a polymer complex of trifluoromethane sulfonic acid with a linear polymer.

36 Claims, 1 Drawing Sheet

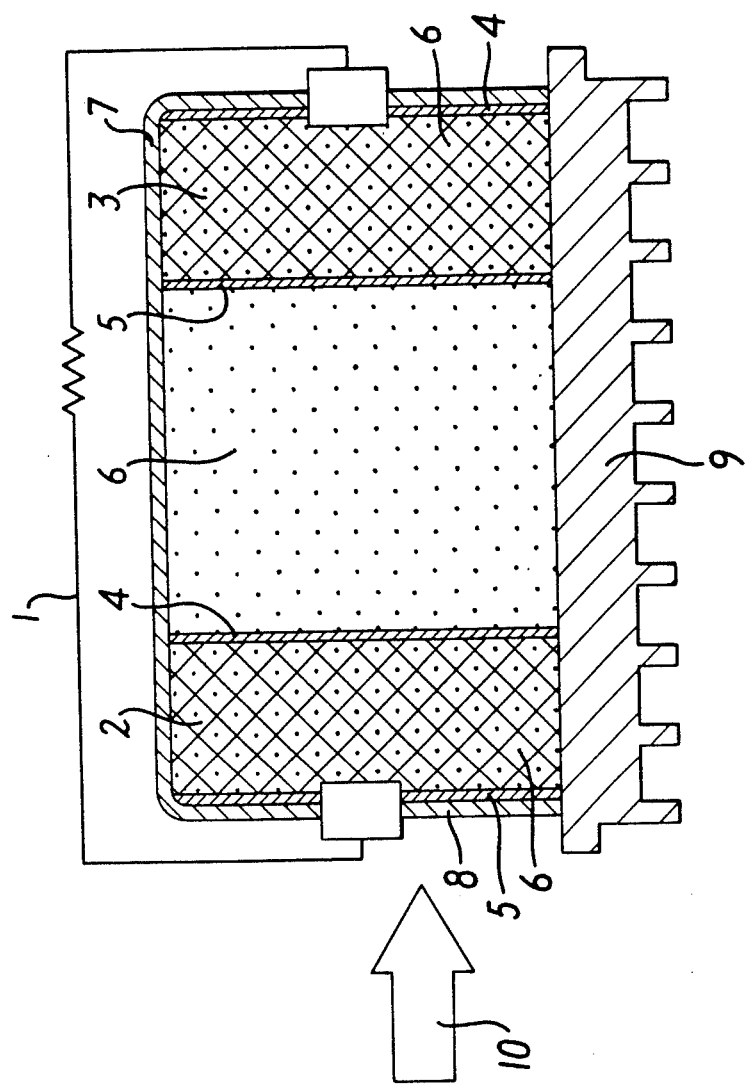

THERMALLY ACTUATED HYDROGEN SECONDARY BATTERY

This application is a continuation-in-part application of U.S. application Ser. No. 838,676, filed Mar. 12, 1986, (now abandoned), which in turn is a continuation-in-part application of U.S. application Ser. No. 790,463, filed Oct. 23, 1985 (now abandoned), which in turn is a continuation-in-part application of U.S. application Ser. No. 681,859, filed Dec. 14, 1984 (now abandoned).

BACKGROUND OF THE INVENTION

The present invention relates to a secondary (rechargeable) battery and more particularly to a thermally actuated or activated hydrogen secondary battery which operates on the principle of intercalation/deintercalation of hydrogen ions ($H^+$) or protons into/from the active materials of the two electrodes.

A secondary battery of the lead-acid type suffers from a number of drawbacks. Thus, its open current voltage, mid-range voltage and energy density are relatively low. Moreover, such a battery is relatively heavy and large.

SUMMARY OF THE INVENTION

It is the principal object of the present invention to provide a secondary battery, which compared to a lead-acid secondary battery, has a relatively high open current voltage, mid-range voltage and energy density and is relatively lightweight and smaller. A further object is to provide means for converting solar thermal energy or waste heat directly into electrical energy via an electrochemical reaction.

The secondary battery of the present invention is a thermally actuated hydrogen secondary battery which comprises:

(a) a porous anode having a thermally actuated anode-active solid reversible hydrogen-containing inorganic compound which deintercalates hydrogen ions ($H^+$) in a discharge cycle when exposed to thermal energy and having a first porous catalytic oxide film selected from the group consisting of ruthenium dioxide, rhenium dioxide and iridium dioxide on a side thereof capable of converting hydrogen ions into hydrogen molecules in a discharge cycle and having a second porous catalytic metal film selected from the group consisting of palladium and platinum black on another side thereof capable of converting hydrogen molecules into hydrogen ions in a charge cycle;

(b) a porous cathode having a hydrogen ion-intercalatable cathode-active material which intercalates hydrogen ions ($H^+$) in a discharge cycle when the anode is exposed to thermal energy and having a first porous catalytic metal film selected from the group consisting of palladium and platinum black on a side thereof capable of converting hydrogen molecules into hydrogen ions in a discharge cycle and having a second porous catalytic oxide film selected from the group consisting of ruthenium dioxide, rhenium dioxide and iridium dioxide on another side thereof capable of converting hydrogen ions into hydrogen molecules in a charge cycle, said first porous catalytic metal film on said porous cathode facing said first porous catalytic oxide film on said porous anode; and (c) a porous solid electrolyte between and within the porous anode and the porous cathode, said porous solid electrolyte containing at least one gas selected from the group consisting of hydrogen and helium for the diffusion of hydrogen molecules between the anode and the cathode, said porous solid electrolyte being a polymer complex of trifluoromethane sulfonic acid with a linear polymer.

DESCRIPTION OF THE DRAWING

The sole figure of the drawing is a schematic, nonscalar, cross-sectional view of an embodiment of the secondary battery of the present invention.

DETAILED DESCRIPTION OF THE INVENTION

Suitable thermally actuated anode-active solid reversible hydrogen-containing inorganic compounds are exemplified below. "Reversible" compounds are compounds which can deintercalate or release hydrogen ions ($H^+$) or protons when exposed to thermal energy in a discharge cycle of the battery leaving behind a host material which can intercalate or insert hydrogen ions ($H^+$) or protons when the thermal energy is removed and/or when electrical work is applied to the battery in a charge cycle.

| | | |
|---|---|---|
| Metal Hydrides: | $NaH, MgH_2, CaH_2, LaH_2, UH_3$ | |
| Hydrides of Transition Metal Intermetallic Compounds: | $VNbZr\ H_x$ | $x = 0.1$ to $4.0$ |
| | $LaNi_5H_x$ | $x = 0.1$ to $7.0$ |
| | $FeTiH_x$ | $x = 0.1$ to $2.0$ |
| | $SmCo_5H_x$ | $x = 0.1$ to $7.0$ |
| | $Mg_2NiH_x$ | $x = 0.1$ to $5.0$ |
| | $TiCr_2H_x$ | $x = 0.1$ to $6.0$ |
| | $CeNi_5H_x$ | $x = 0.1$ to $7.0$ |
| Hydrogen Intercalates of Transition Metal Sulfides: | $H_xWS_2$ | $x = 0.1$ to $3.0$ |
| | $H_xCrS_4$ | $x = 0.1$ to $6.0$ |
| Hydrogen Intercalates of Transition Metal Oxides: | $H_xV_6O_{13}$ | $x = 0.1$ to $8.0$ |
| | $H_xWO_3$ | $x = 0.1$ to $2.0$ |
| | $H_xV_2O_5$ | $x = 0.1$ to $5.0$ |
| | $H_xMoO_3$ | $x = 0.1$ to $3.0$ |
| | $H_xReO_3$ | $x = 0.1$ to $3.0$ |
| Hydrogen Intercalates of Transition Metal Halooxides: | $H_xFeOCl$ | $x = 0.1$ to $4.0$ |
| | $H_xNiOCl$ | $x = 0.1$ to $5.0$ |
| | $H_xNiOCl_xF_{1-x}$ | $x = 0.1$ to $5.0$ |
| Hydrogen Intercalates of Transition Metal Carbides: | $H_xWC_y$ | $x = 0.1$ to $5.0$; $y = 1$ to $3$ |
| | $H_xTaC_y$ | $x = 0.1$ to $5.0$; $y = 3$ to $5$ |
| | $H_xTiC_y$ | $x = 0.1$ to $3.0$; $y = 1$ to $3$ |
| Hydrogen Intercalates Of Transition Metal Phosphosulfides: | $H_xNiPS_3$ | $x = 0.1$ to $3.0$ |
| | $H_xCrPS_4$ | $x = 0.1$ to $3.0$ |
| Hydrogen Intercalates of Transition Metal Carbosulfides: | $H_xTaC_2S_2$ | $x = 0.1$ to $3.0$ |

Suitable hydrogen ion-intercalatable cathode-active materials are exemplified below.

| | | |
|---|---|---|
| Alkali, Alkaline Earth and Transition Metals: | Na, Mg, Ca, La, U | |
| Transition Metal Intermetallic Compounds: | $VNbZr, LaNi_5, FeTi, SmCo_5, PrCo_5,$ $NdCo_5, GdCo_5, PrNi_5, SmNi_5,$ | |
| Transition Metal Sulfides: | $WS_2, CrS_4$ | |
| Transition Metal Oxides: | $V_6O_{13+y}$ | $y = 0.0$ to $0.4$ |
| | $WO_3, V_2O_5, MoO_3, ReO_3$ | |
| Transition Metal Halooxides: | $FeOCl, NiOCl, NiOCl_xF_{1-x}$ | $x = 0.1$ to $5.0$ |
| Transition Metal Carbides: | $WC_y$ | $y = 1$ to $3$ |
| | $TaC_y$ | $y = 3$ to $5$ |
| | $TiC_y$ | $y = 1$ to $3$ |
| Transition Metal Phosphosulfides: | $TiPS_3, NiPS_3, CrPS_3, CrPS_4$ | |

| | |
|---|---|
| -continued | |
| Transistion Metal Carbosulfides: | TaC$_2$S$_2$ |

The first porous catalytic film on the anode capable of converting hydrogen ions (H$^+$) into hydrogen molecules (H$_2$) in a discharge cycle and the second porous catalytic film on the cathode capable of converting hydrogen ions into hydrogen molecules in a charge cycle can each be, as noted above, an oxide, namely ruthenium dioxide (RuO$_2$), rhenium dioxide (ReO$_2$) or iridium dioxide (IrO$_2$).

The second porous catalytic film on the anode capable of converting hydrogen molecules (H$_2$) into hydrogen ions (H$^+$) in a charge cycle and the first porous catalytic film on the cathode capable of converting hydrogen molecules into hydrogen ions in a discharge cycle can each be, as noted above, a metal, namely palladium (Pd) or platinum black (Pt).

As noted above, the porous solid electrolyte or solid proton ionic conductor contains a gas, namely hydrogen and/or helium, at 1-10 atmospheres of pressure for the diffusion of hydrogen molecules between the anode and the cathode. The porous solid electrolyte is a polymer complex of trifluoromethane sulfonic acid (CF$_3$SO$_3$H) with a linear polymer, such as poly(diphenoxyphosphazene), poly(di[2(2-methoxyethoxy)ethoxy]phosphazene), poly(difluorophosphazene), poly(difluoroalkoxyphosphazene), polyethylene oxide or polypropylene oxide, all of which polymers are well known. The polymer complex can be prepared by dissolution of CF$_3$SO$_3$H and the linear polymer in tetrahydrofuran as a mutual solvent (distilled from sodium benzophenone) and evaporation of the solvent to form a thin film using a mole ratio of about 0.25-5.1 of H$^+$cations of the CF$_3$SO$_3$H to one mole of the repeat unit of the phosphazene polymer and a mole ratio of about 0.10-5.1 of H$^+$cations of the CF$_3$SO$_3$H to one mole of the repeat unit of the polyalkylene oxide polymer. Repeat unit mole is equivalent to the molecular weight of the polymer repeat unit, e.g., $+CH_2CH_2O+_n$ using polyethylene oxide as an example or $+N=P$ (OEt OEt OMe)$_2+_n$ using poly(di[2(2-methoxyethoxy)ethoxy]phosphazene) as an example. The polymer complex of poly(di[2(2-methoxyethoxy)ethoxy]phosphazene) is used in cells operated at temperatures between about 10° C.-100° C., while the other polymer complexes can be substituted therefor in cells operating at temperatures between about 100° C.-150° C. These polymer complexes are proton ionic conductors due to the mobile hydrogen cation (H$^+$) or proton and the mobile anion (CF$_3$SO$_3^-$) and hence they provide a path between the electrodes for the migration of those deintercalated hydrogen ions or protons that may not be converted into hydrogen molecules by the oxide catalytic films.

In the anode and cathode of the secondary battery, the cathode-active material can be codispersed with a carbon black depolarizer using an EPDM (ethylene-propylene-diene monomer) based elastomer of TFE (tetrafluoroethylene) binder with a final configuration of the electrode in a reticulated foam (80%-97% open porosity) or the anode-active and cathode-active materials can be applied to the surface of a foam or reticulated metal-like current collector, such as a platinum-plated nickel foam of 3% density. In operation of the secondary battery, both the anode and cathode are ohmically connected to the external circuit 1 through the porous current collector by means that avoid rectifying diode behavior.

The secondary battery has a porous anode 2 and a porous cathode 3, both having the two porous catalytic oxide and metal films 4 and 5, respectively, on opposite sides thereof, with the gas-containing porous solid electrolyte 6 between and within the porous anode 2 and the porous cathode 3. The porous catalytic metal film 5 on the porous cathode 3 faces the porous catalytic oxide film 4 on the porous anode 2. The side locations of the two different catalytic films 4 and 5 on the anode 2 can be transposed provided the side locations of the two different catalytic films 4 and 5 on the cathode 3 are also transposed. The catalytic films 4 and 5, which can be formed by evaporation of tetrahydrofuran slurries thereof, can be bindered to the electrodes 2 and 3 by the same polymer complex material used in making the porous solid electrolyte 6. The catalytic oxide films 4 can be applied to one side of the anode 2 and to one side of the cathode 3 by conventional ion beam sputtering deposition techniques. The catalytic metal films 5 can be applied to the other side of the anode 2 and to the other side of the cathode 3 by conventional argon plasma deposition techniques. The porous solid electrolyte 6 can be made by uniformly coating the polymer complex material onto and into a 93% porous polyethylene foam or a glass fiber matting. These components are enclosed within a gas-tight envelope 7. The gas-type envelope 7 at least adjacent the anode 2 is made of a heat-absorbant material 8, such as pyrolytic grade graphite or reduced metal intercalate of graphite, so that the anode 2 can be thermally actuated during discharge. The battery can be provided with a heat sink 9, if desired.

These secondary batteries are actuated in the discharge cycle by impinging thermal energy (heat) 10 onto the anode 2 or onto the total cell, such as thermal energy from waste heat or solar thermal irradiation. Laser energy or microwave energy can also be used. The thermal energy input is either ambient incident irradiation or concentrated above ambient energy. The cells are actuated and discharge at cell operating temperatures between about 10° C.-150° C. The cells are charged in the charge cycle by the removal of thermal energy (heat) and/or by the addition of electrical work. During discharging, hydrogen ions (H$^+$) or protons are deintercalated or released from the anode-active material and intercalated (inserted or topotactically reacted) into the cathode-active material; during charging, the reverse reaction occurs, i.e., hydrogen ions (H$^+$) or protons are deintercalated or released from the original cathode-active material and intercalated (inserted or topotactically reacted) into the original anode-active material. During discharging, the first catalytic film (RuO$_2$, ReO$_2$, IrO$_2$) on the anode converts the hydrogen ions (H$^+$) into hydrogen molecules (H$_2$) which diffuse through the gas-containing porous solid electrolyte to the cathode where the first catalytic film (Pd, Pt) on the cathode converts the hydrogen molecules (H$_2$) into hydrogen ions (H$^+$). During charging, the second catalytic film (RuO$_2$, ReO$_2$, IrO$_2$) on the original cathode converts the hydrogen ions (H$^+$) into hydrogen molecules (H$_2$) which diffuse through the gas-containing porous solid electrolyte to the original anode where the second catalytic film (Pd, Pt) on the original anode converts the hydrogen molecules (H$_2$) into hydrogen ions (H$^+$).

The principles of operation of the thermally actuated hydrogen secondary battery are illustrated by the following half cell and overall cell discharge cycle reactions for a cell having a $VNbZrH_3$ anode and a $V_6O_{13}$ cathode, each electrode having a $ReO_2$ catalytic film and a Pt black catalytic film on their opposite sides, and having a porous solid electrolyte containing helium gas and formed of a polymer complex of trifluoromethane sulfonic acid with linear poly(di[2(2-methoxyethoxy)ethoxy]phosphazene):

At Anode:
$$2.413 \, VNbZrH_3 \xrightarrow{\Delta} 3.62 \, H_2 + 2.413 \, VNbZr$$

$$7.24 \, H^+ \longrightarrow 3.62 \, H_2 - 7.24 \, e^-$$

At Cathode:
$$V_6O_{13} + 3.62 \, H_2 \xrightarrow{\Delta} H_{7.24}V_6O_{13}$$

$$3.62 \, H_2 \longrightarrow 7.24^+ + 7.24 \, e^-$$

The overall cell discharge cycle reaction for this cell is:

$$2.413 \, VNbZrH_3 + V_6O_{13} \xrightarrow{\Delta} H_{7.24}V_6O_{13} + 2.413 \, VNbZr$$

With the removal of heat ($-\Delta$) and/or the application of electrical work, the following reverse half cell and overall cell charge cycle reactions occur: at the $H_{7.24}V_6O_{13}$ Electrode (original cathode during discharge):

$$H_{7.24}V_6O_{13} \xrightarrow{-\Delta} V_6O_{13} + 3.62 \, H_2$$

$$7.24 \, H^+ \longrightarrow 3.62 \, H_2 - 7.24 \, e^-$$

at the 2.413 VNbZr Electrode (original anode during discharge):

$$2.413 \, VNbZr + 3.62 \, H_2 \xrightarrow{-\Delta} 2.413 \, VNbZrH_3$$

$$3.62 \, H_2 \longrightarrow 7.24 \, H^+ + 7.24 \, e^-$$

overall cell charge cycle reaction:

$$2.413 \, VNbZr + H_{7.24}V_6O_{13} \xrightarrow{-\Delta} V_6O_{13} + 2.413 \, VNbZrH_3$$

Overall cell discharge cycle reactions and calculated energy density for various exemplary thermally actuated hydrogen secondary batteries of the invention are as follows:

| Reaction | Calculated Energy Density (W-Hrs/kg) |
|---|---|
| $2.413 \, VNbZrH_3 + V_6O_{13} \xrightarrow{\Delta} H_{7.24}V_6O_{13} + 2.413 \, VNbZr$ | 1738 |
| $1.21 \, LaNi_5H_6 + V_6O_{13} \xrightarrow{\Delta} H_{7.24}V_6O_{13} + 1.21 \, LaNi_5$ | 693.96 |
| $7.24 \, FeTiH + V_6O_{13} \xrightarrow{\Delta} H_{7.24}V_6O_{13} + 7.24 \, FeTi$ | 1057.4 |
| $1.21 \, SmCo_5H_6 + V_6O_{13} \xrightarrow{\Delta} H_{7.24}V_6O_{13} + 1.21 \, SmCo_5$ | |
| $2.413 \, Mg_2NiH_3 + V_6O_{13} \xrightarrow{\Delta} H_{7.24}V_6O_{13} + 2.413 \, Mg_2Ni$ | 1051.9 |
| $2.413 \, TiCr_2H_3 + V_6O_{13} \xrightarrow{\Delta} H_{7.24}V_6O_{13} + 2.413 \, TiCr_2$ | 980.2 |
| $1.5 \, FeTiH_2 + V_2O_5 \xrightarrow{\Delta} H_3V_2O_5 + 1.5 \, FeTi$ | 1941.6 |
| $1.21 \, CeNi_5H_6 + V_6O_{13} \xrightarrow{\Delta} H_{7.24}V_6O_{13} + 2.413 \, CeNi_5$ | |
| $1.33 \, VNbZrH_3 + V_2O_5 \xrightarrow{\Delta} H_4V_2O_5 + 1.33 \, VNbZr$ | |
| $0.2 \, VNbZrH_3 + WO_3 \xrightarrow{\Delta} H_{0.6}WO_3 + 0.2 \, VNbZr$ | |
| $0.67 \, VNbZrH_3 + MoO_3 \xrightarrow{\Delta} H_2MoO_3 + 0.67 \, VNbZr$ | |
| $0.453 \, VNbZrH_3 + ReO_3 \xrightarrow{\Delta} H_{1.36}ReO_3 + 0.453 \, VNbZr$ | |

With the removal of the heat ($-\Delta$) and/or the application of electrical work, the reverse charge cycle reactions occur.

The above calculation of the cell energy density is accomplished by the following relationship:

$E_D$(W-hrs/kg) = $[(MRV)(F)(t_k)(n)]/[A_{(wgt)} + C_{(wgt)}]$
where $E_D$ = cell energy density at the end of a discharge in W-hrs/kg
MRV = cell midrange voltage (volts)
F = chemical Faraday's constant (96,486 coulombs/equivalent)
$t_k$ = a conversion factor for seconds to hours = $2.78 \times 10^{-4}$
n = number of equivalents transferred
A wgt = anode molecular weight in kgs.
C wgt = cathode molecular weight in kgs.

The MRV is normally defined from a cell discharge curve.

The advantages of the thermally actuated hydrogen secondary battery of the invention over the conventional lead-acid storage battery are tabulated below.

| | Hydrogen Battery | Lead-Acid Battery |
|---|---|---|
| Open Circuit Voltage (volts versus normal hydrogen electrode) | up to +5.1 | −1.2 (maximum) |
| Midrange Voltage (volts versus normal hydrogen electrode) | +3.4 to 2.8 | −0.8 to −0.6 |
| Energy Density (W/hrs/kg) | ~700 to ~2000 | 30–62 |

|  | Hydrogen Battery | Lead-Acid Battery |
|---|---|---|
| Relative Weight Ratio (Hydrogen/Lead Acid) | 0.10 to 0.25 | 1.0 |
| Relative Volume Ratio (Hydrogen/Lead Acid) | 0.15 to 0.30 | 1.0 |
| Operating Range | 30° C. to 150° C. | −10° C. to 50° C. |
| Transfer Medium | gas | liquid or gel |

A thermally actuated hydrogen secondary battery designed and fabricated to deliver 12 volts can contain 30% the number of cells, typically weight 5%–25% as much, occupy 10%–30% the volume and deliver twelve times the energy density of a lead-acid battery.

The thermally actuated hydrogen secondary battery of the invention can be used for converting solar thermal energy or waste heat into electrical energy, for utility load levelling, in electrical vehicles and in military applications. The device of the invention also can be used as an electrochemical sensor for the determination of hydrogen if a metallic electrode is substituted for the reversible hydrogen-containing inorganic compound or can function as an electrochemical sensor for the determination of temperature, with presently indicated cathodes, by the direct relationship between temperature and hydrogen ion (H+) activity as reflected by the change in potential of the cell in the 30° C. to 250° C. temperature range. As a sensor the cell can be miniaturized and placed on an integrated circuit chip and used as a smart sensor.

What is claimed is:

1. A thermally actuated hydrogen secondary battery which comprises:
   (a) a porous anode having a thermally actuated anode-active solid reversible hydrogen-containing inorganic compound which deintercalates hydrogen ions (H+) in a discharge cycle when exposed to thermal energy and having a first porous catalytic oxide film selected from the group consisting of ruthenium dioxide, rhenium dioxide and iridium dioxide on a side thereof capable of converting hydrogen ions into hydrogen molecules in a discharge cycle and having a second porous catalytic metal film selected from the group consisting of palladium and platinum black on another side thereof capable of converting hydrogen molecules into hydrogen ions in a charge cycle;
   (b) a porous cathode having a hydrogen ion-intercalatable cathode-active material which intercalates hydrogen ions (H+) in a discharge cycle when the anode is exposed to thermal energy and having a first porous catalytic metal film selected from the group consisting of palladium and platinum black on a side thereof capable of converting hydrogen molecules into hydrogen ions in a discharge cycle and having a second porous catalytic oxide film selected from the group consisting of ruthenium dioxide, rhenium dioxide and iridium dioxide on another side thereof capable of converting hydrogen ions into hydrogen molecules in a charge cycle, said first porous catalytic metal film on said porous cathode facing said first porous catalytic oxide film on said porous anode; and
   (c) a porous solid electrolyte between and within the porous anode and the porous cathode, said porous solid electrolyte containing at least one gas selected from the group consisting of hydrogen and helium for the diffusion of hydrogen molecules between the anode and the cathode, said porous solid electrolyte being a polymer complex of trifluoromethane sulfonic acid with a linear polymer.

2. A secondary battery according to claim 1 wherein the thermally actuated anode-active solid reversible hydrogen-containing inorganic compound is a metal hydride.

3. A secondary battery according to claim 1 wherein the thermally actuated anode-active solid reversible hydrogen-containing inorganic compound is a hydride of a transition metal intermetallic compound.

4. A secondary battery according to claim 1 wherein the thermally actuated anode-active solid reversible hydrogen-containing inorganic compound is a hydrogen intercalate of a transition metal sulfide.

5. A secondary battery according to claim 1 wherein the thermally actuated anode-active solid reversible hydrogen-containing inorganic compound is a hydrogen intercalate of a transition metal oxide.

6. A secondary battery according to claim 1 wherein the thermally actuated anode-active solid reversible hydrogen-containing inorganic compound is a hydrogen intercalate of a transition metal halooxide.

7. A secondary battery according to claim 1 wherein the thermally actuated anode-active solid reversible hydrogen-containing inorganic compound is a hydrogen intercalate of a transition metal carbide.

8. A secondary battery according to claim 1 wherein the thermally actuated anode-active solid reversible hydrogen-containing inorganic compound is a hydrogen intercalate of a transition metal phosphosulfide.

9. A secondary battery according to claim 1 wherein the thermally actuated anode-active solid reversible hydrogen-containing inorganic compound is a hydrogen intercalate of a transition metal carbosulfide.

10. A secondary battery according to claim 1 wherein the hydrogen ion-intercalatable cathode-active material is an alkali metal.

11. A secondary battery according to claim 1 wherein the hydrogen ion-intercalatable cathode-active material is an alkaline earth metal.

12. A secondary battery according to claim 1 wherein the hydrogen ion-intercalatable cathode-active material is a transition metal.

13. A secondary battery according to claim 1 wherein the hydrogen ion-intercalatable cathode-active material is a transition metal intermetallic compound.

14. A secondary battery according to claim 1 wherein the hydrogen ion-intercalatable cathode-active material is a transition metal sulfide.

15. A secondary battery according to claim 1 wherein the hydrogen ion-intercalatable cathode-active material is a transition metal oxide.

16. A secondary battery according to claim 1 wherein the hydrogen ion-intercalatable cathode-active material is a transition metal halooxide.

17. A secondary battery according to claim 1 wherein the hydrogen ion-intercalatable cathode-active material is a transition metal carbide.

18. A secondary battery according to claim 1 wherein the hydrogen ion-intercalatable cathode-active material is a transition metal phosphosulfide.

19. A secondary battery according to claim 1 wherein the hydrogen ion-intercalatable cathode-active material is a transition metal carbosulfide.

20. A secondary battery according to claim 1 wherein the liner polymer is polyethylene oxide.

21. A secondary battery according to claim 1 wherein the linear polymer is polypropylene oxide.

22. A secondary battery according to claim 1 wherein the linear polymer is poly(diphenoxyphosphazene).

23. A secondary battery according to claim 1 wherein the linear polymer is poly(di[2(2-methoxyethoxy)ethoxy]phosphazene).

24. A secondary battery according to claim 1 wherein the linear polymer is poly(difluorophosphazene).

25. A secondary battery according to claim 1 wherein the linear polymer is poly(difluoroalkoxyphosphazene).

26. A secondary battery according to claim 1 wherein the thermally actuated anode-active solid reversible hydrogen-containing inorganic compound is $VNbZrH_3$ and the hydrogen ion-intercalatable cathode-active material is $V_6O_{13}$.

27. A secondary battery according to claim 1 wherein the thermally actuated anode-active solid reversible hydrogen-containing inorganic compound is $LaNi_5H_6$ and the hydrogen ion-intercalatable cathode-active material is $V_6O_{13}$.

28. A secondary battery according to claim 1 wherein the thermally actuated anode-active solid reversible hydrogen-containing inorganic compound is FeTiH and the hydrogen ion-intercalatable cathode-active material is $V_6O_{13}$.

29. A secondary battery according to claim 1 wherein the thermally actuated anode-active solid reversible hydrogen-containing inorganic compound is $SmCo_5H_6$ and the hydrogen ion-intercalatable cathode-active material is $V_6O_{13}$.

30. A secondary battery according to claim 1 wherein the thermally actuated anode-active solid reversible hydrogen-containing inorganic compound is $Mg_2NiH_3$ and the hydrogen ion-intercalatable cathode-active material is $V_6O_{13}$.

31. A secondary battery according to claim 1 wherein the thermally actuated anode-active solid reversible hydrogen-containing inorganic compound is $TiCR_2H_3$ and the hydrogen ion-intercalatable cathode-active material is $V_6O_{13}$.

32. A secondary battery according to claim 1 wherein the thermally actuated anode-active solid reversible hydrogen-containing inorganic compound is $CeNi_5H_6$ and the hydrogen ion-intercalatable cathode-active material is $V_6O_{13}$.

33. A secondary battery according to claim 1 wherein the thermally actuated anode-active solid reversible hydrogen-containing inorganic compound is $VNbZrH_3$ and the hydrogen ion-intercalatable cathode-active material is $V_2O_5$.

34. A secondary battery according to claim 1 wherein the thermally actuated anode-active solid reversible hydrogen-containing inorganic compound is $VNbZrH_3$ and the hydrogen ion-intercalatable cathode-active material is $WO_3$.

35. A secondary battery according to claim 1 wherein the thermally actuated anode-active solid reversible hydrogen-containing inorganic compound is $VNbZrH_3$ and the hydrogen ion-intercalatable cathode-active material is $MoO_3$.

36. A secondary battery according to claim 1 wherein the thermally actuated anode-active solid reversible hydrogen-containing inorganic compound is $VNbZrH_3$ and the hydrogen ion-intercalatable cathode-active material is $ReO_3$.

* * * * *